Oct. 26, 1954

T. A. D. WILSON 2,692,652

SAFETY DEVICE FOR USE WITH TRACTORS AND THE LIKE

Filed May 2, 1950

INVENTOR:
THOMAS ALEXANDER DONALD WILSON
By Wenderoth, Lind & Ponack
ATTORNEYS

Patented Oct. 26, 1954

2,692,652

UNITED STATES PATENT OFFICE 2,692,652

SAFETY DEVICE FOR USE WITH TRACTORS AND THE LIKE

Thomas Alexander Donald Wilson, Ashburton, Canterbury, New Zealand

Application May 2, 1950, Serial No. 159,404

Claims priority, application New Zealand May 3, 1949

5 Claims. (Cl. 180—82)

The invention relates to devices used with tractors and the like, which expression is intended to include all farming and agricultural and earth moving machines, provided with their own means of generating power for their propulsion.

The object of the invention is to provide an improved form of device designed to give warning to the driver of said machines when travelling over sloping or uneven ground surfaces, of the angle of inclination or canting of the machines, reaching a point or degree approaching danger, as regards capsizing or overturning of the machines, often with fatal results, and finally, should the warning go unheeded, to render the machine inoperative against further travel, which would accentuate the danger.

The invention resides in providing on the power unit of a tractor or the like, an electrical wiring system which incorporates an earthed mercury switch adapted firstly to operate a warning device, and secondly to render said power unit inoperative, upon the tractor or the like canting or tilting beyond a predetermined point or degree.

Figure 1:
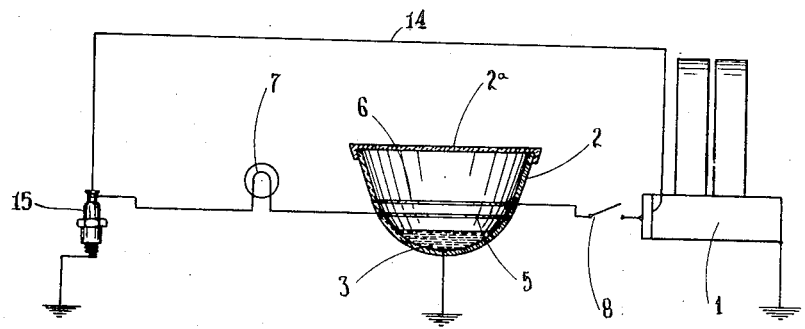
Figure 2:
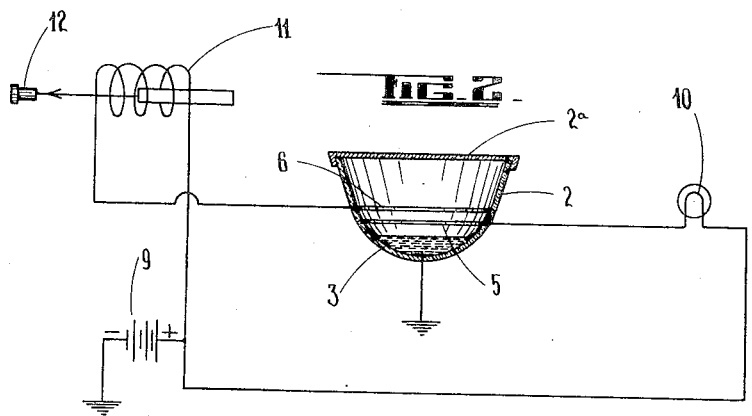

In the accompanying drawing in conjunction with which the invention will be more particularly described, Figure 1 is a wiring diagram illustrating the application of the invention to a motor power unit provided with a magneto ignition, Figure 2 is a wiring diagram illustrating the application of the invention to a diesel type motor power unit.

Figure 3:
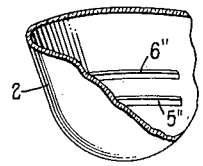
Figure 4:
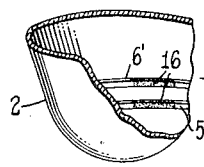

Fig. 3 is a partial perspective view of the bowl with parts broken away illustrating a modification, and Fig. 4 is a similar view illustrating a further modification.

The improved device will be further described as applied to a tractor equipped with a magneto 1 (Figure 1). The earthed mercury switch can comprise a bowl 2 of plastic or other material a non-conductor of electricity, containing mercury 3 or other suitable substance which will act similarly thereto, as regards closing electric circuits.

The bowl 2 preferably has a cover 2ª and is formed with sloping sides, and the bottom is rounded to more effectually retain the mercury. Within the bowl 2 are metal rings 5, 6 spaced apart at different levels around the sides of the bowl 2 above the mercury 3. The lower ring 5 is connected to a neon lamp 7 wired with a high tension portion 14 going to the spark plug 15 of the tractor ignition system. The upper or second ring 6 is also connected with the ignition system to short same to earth when required. The mercury 3 is retained at the bottom of the bowl 2 and in the normal position thereof, the level of the mercury 3 is below the lower ring 5, but as soon as the tractor cants or tilts to a danger point of tipping, the mercury 3 moves and comes into contact with the first or lower ring 5 and closes the circuit through the neon lamp 7, thereby giving the driver warning in time to bring the tractor back to a safe position.

Should the tractor continue to cant or tilt, the mercury 3 then contacts the upper or second ring 6 and automatically switches off the engine ignition by grounding or shorting the ignition system through the earthed mercury 3, and thereby stopping the engine.

In order to prevent the mercury 3 from splashing, baffles are placed across the bottom of the bowl 2. These baffles enable the mercury to flow quickly but prevent premature contacting of the rings 5, 6.

To prevent the device operating where the tractor or the like may be travelling downhill, the front portions of the rings 5', 6' as shown in Fig. 4 may be either coated with a non-conducting material 16, or said rings 5'', 6'' as shown in Fig. 3 may be of horse shoe shape instead of circular, as otherwise the device would operate no matter which way the tractor or the like canted.

In order to restart the tractor or the like after the device has stopped the engine, and until the tractor can be brought back to a safety position, the device is electrically disconnected by a switch or key 8 connected to the magneto grounding terminal. The device can be attached to a tractor in any convenient position, but preferably at or close to the magneto 1.

As applied to a diesel type motor power unit, not provided with spark plug ignition, the bowl 2 with rings 5 and 6 and grounded mercury 3 are provided as before, and a supply of electrical current is derived from a battery 9, a lamp 10 being provided in the circuit between the battery 9 and the ring 5, while a movable core solenoid 11 is provided in the circuit between the ring 6 and the battery 9.

Upon the tractor or the like canting or tilting sufficiently, the grounded mercury 3 or its substitute in the bowl 2, contacts the ring 5 and closes the circuit through the lamp 10, whereby the latter wil be illuminated.

Continued canting or tilting of the tractor or the like to a point or degree which approaches danger of capsizing or overturning of the tractor or the like, results in the mercury 3 contacting ring 6 whereby the circuit through the 11 is closed, and the latter is energised and acts to operate a fuel control cock 12 to the motor, so that the supply of fuel to the latter is cut off and the motor is rendered inoperative.

What I do claim and desire to obtain by Letters Patent of the United States of America is:

1. A safety device for use in connection with vehicles including a power unit and having an electrical wiring system comprising a grounded mercury switch in such wiring system, said mercury switch comprising a bowl and having mercury therein, two vertically spaced rings in said bowl of electrically conductive material, a warning device operatively connected to the lower of said rings and means connected to the upper of said rings adapted to render said power unit inoperative, said device on tilting first operating said warning device by contact of said mercury with the lower of said rings and upon further tilting actuating said means by contact of the mercury with the upper of said rings to render said power unit in said vehicle inoperative.

2. A safety device as claimed in claim 1, said bowl consisting in a material non-conductive of electricity and wherein the bottom portion of said bowl is rounded, said rings completely encircling the interior surface of said bowl.

3. A safety device as claimed in claim 1, said bowl consisting in a material non-conductive of electricity and wherein the bottom portion of said bowl is rounded, said rings being conductive only partially around the interior surface of said bowl thereby providing selective inoperative positions when said device is tilted.

4. A safety device as claimed in claim 1, and wherein said means to render said power unit inoperative comprises short-circuiting means connected in the electrical wiring system.

5. A safety device as claimed in claim 1 and including a movable core solenoid connected in said electrical wiring system, a fuel supply valve for said power unit in proximity to said movable core and actuatable thereby, energizing means for said electrical wiring system, said solenoid being connected in said wiring system between said energizing means and the upper of said rings, whereby upon tilting and contact being made between said mercury and the upper of said rings said solenoid is actuated and said movable core contacts and moves said fuel supply valve to said power unit thereby closing off the fuel supply thereto.

References Cited in the file of this patent

UNITED STATES PATENTS

| Number | Name | Date |
| --- | --- | --- |
| Re. 19,234 | Hendrickson | July 10, 1934 |
| 1,867,278 | Pensrum | July 12, 1932 |
| 2,075,040 | Kieber | Mar. 30, 1937 |
| 2,155,758 | Hinde | Apr. 25, 1939 |
| 2,192,262 | Griesedieck | Mar. 5, 1940 |